Jan. 24, 1928.
A. H. PITNEY
1,657,279
POSTAGE METER
Filed July 12, 1922
6 Sheets-Sheet 1
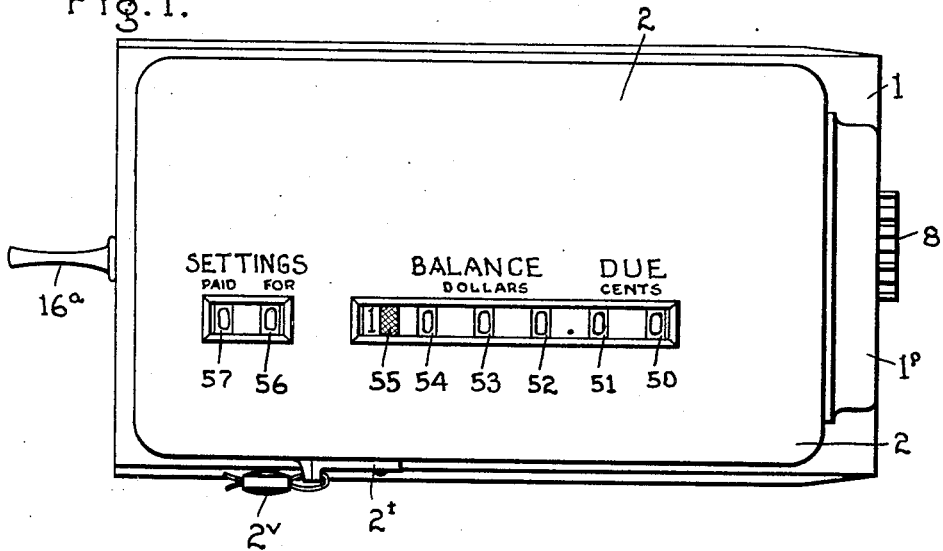
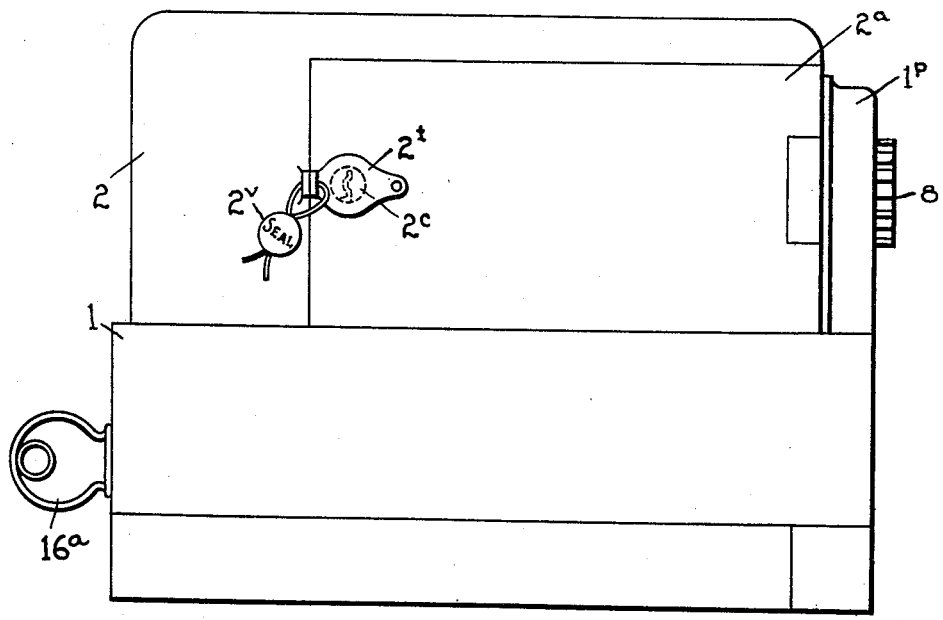

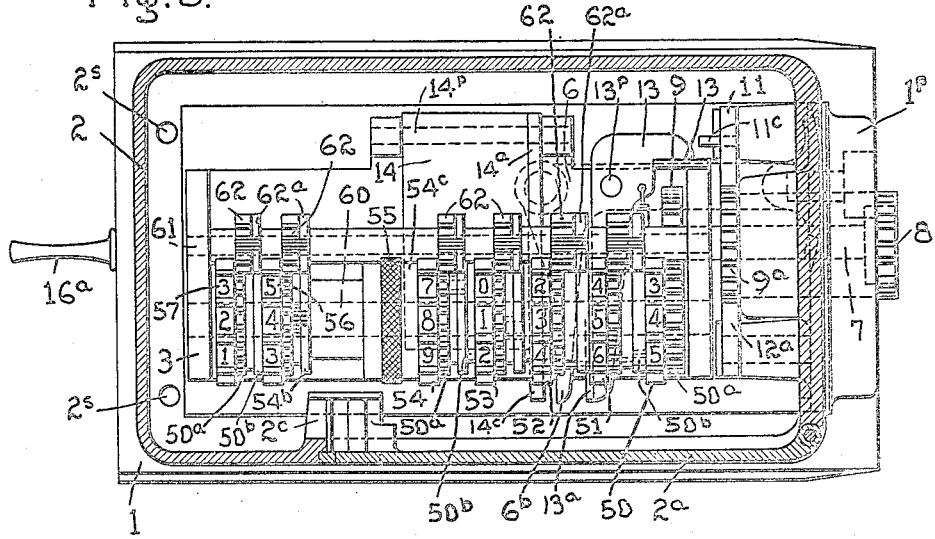
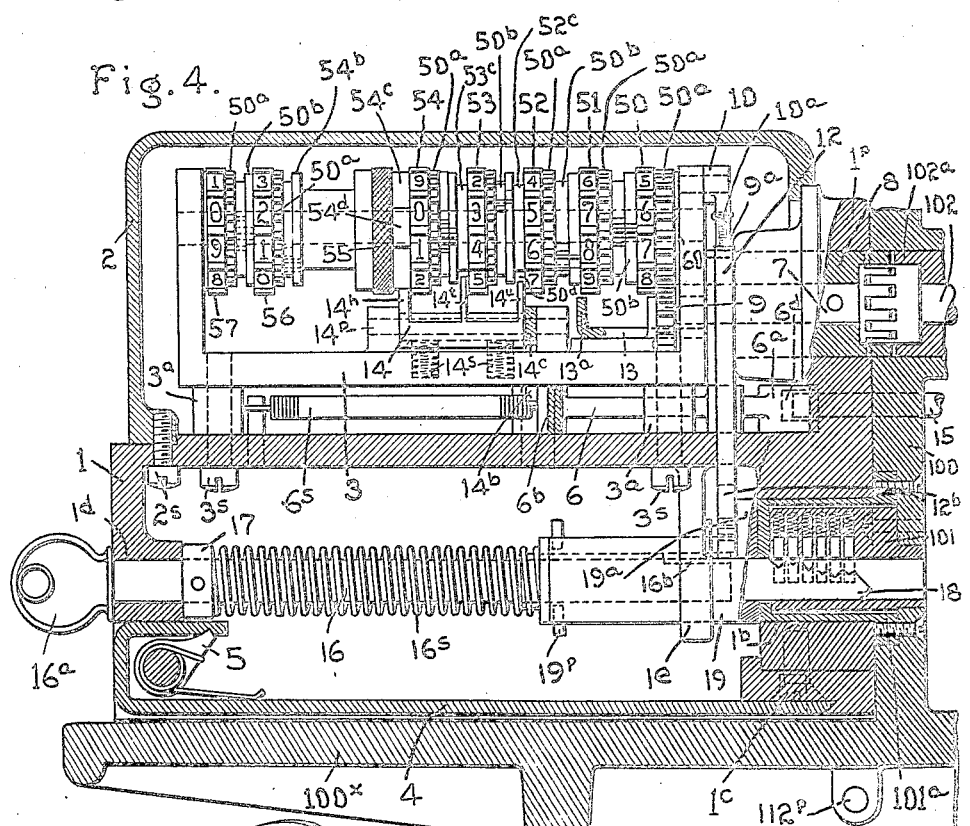

Jan. 24, 1928.

A. H. PITNEY 1,657,279

POSTAGE METER

Filed July 12, 1922

Jan. 24, 1928.
A. H. PITNEY
1,657,279
POSTAGE METER
Filed July 12, 1922
6 Sheets-Sheet 4
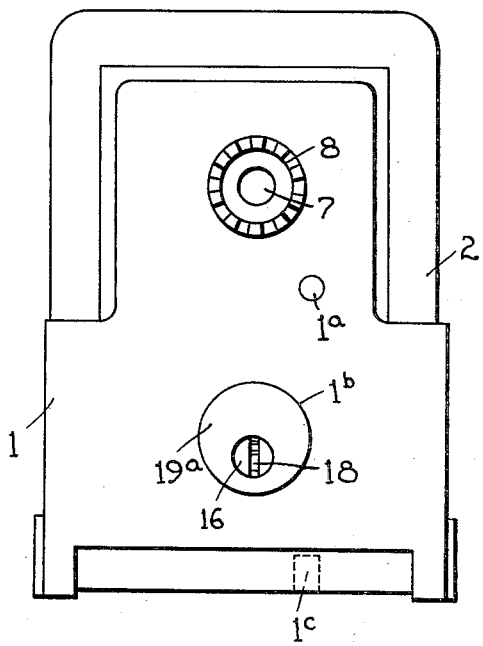
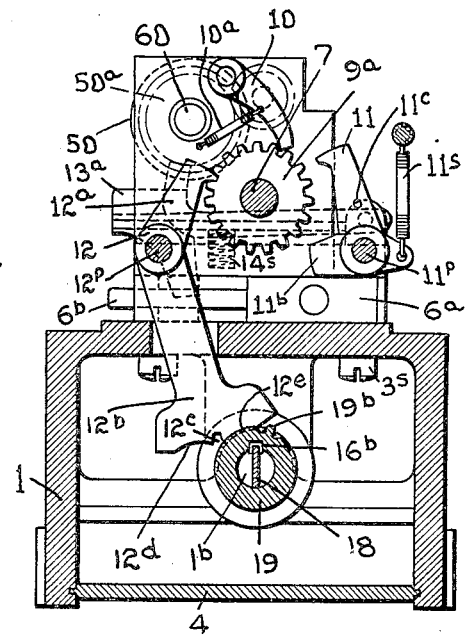
Inventor
Arthur H. Pitney
By Alexander Lowell
Attorney

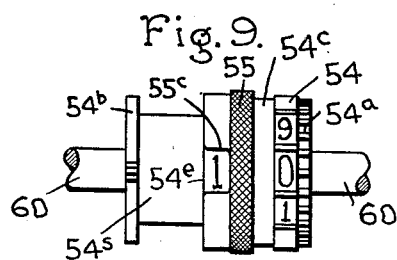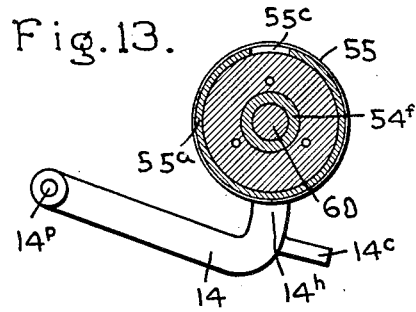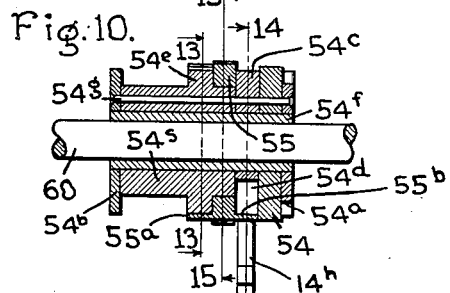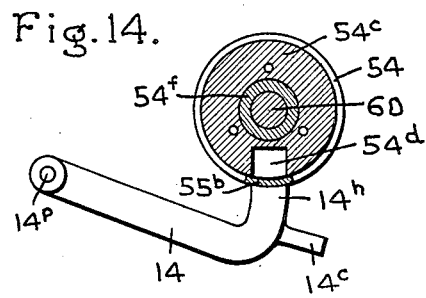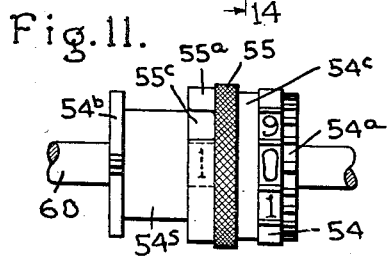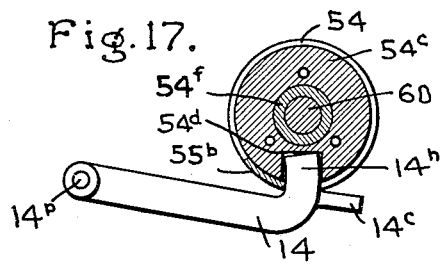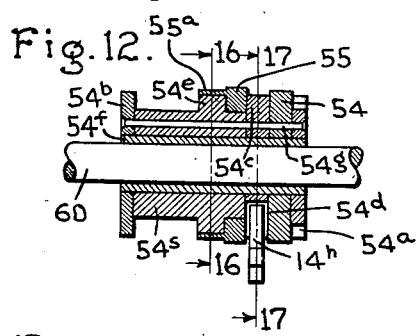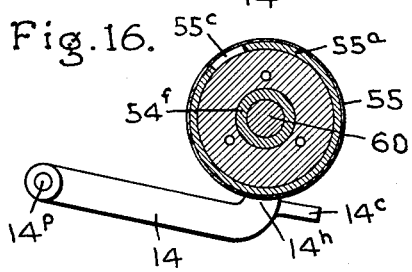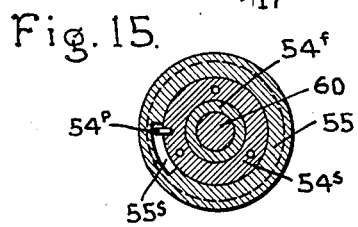

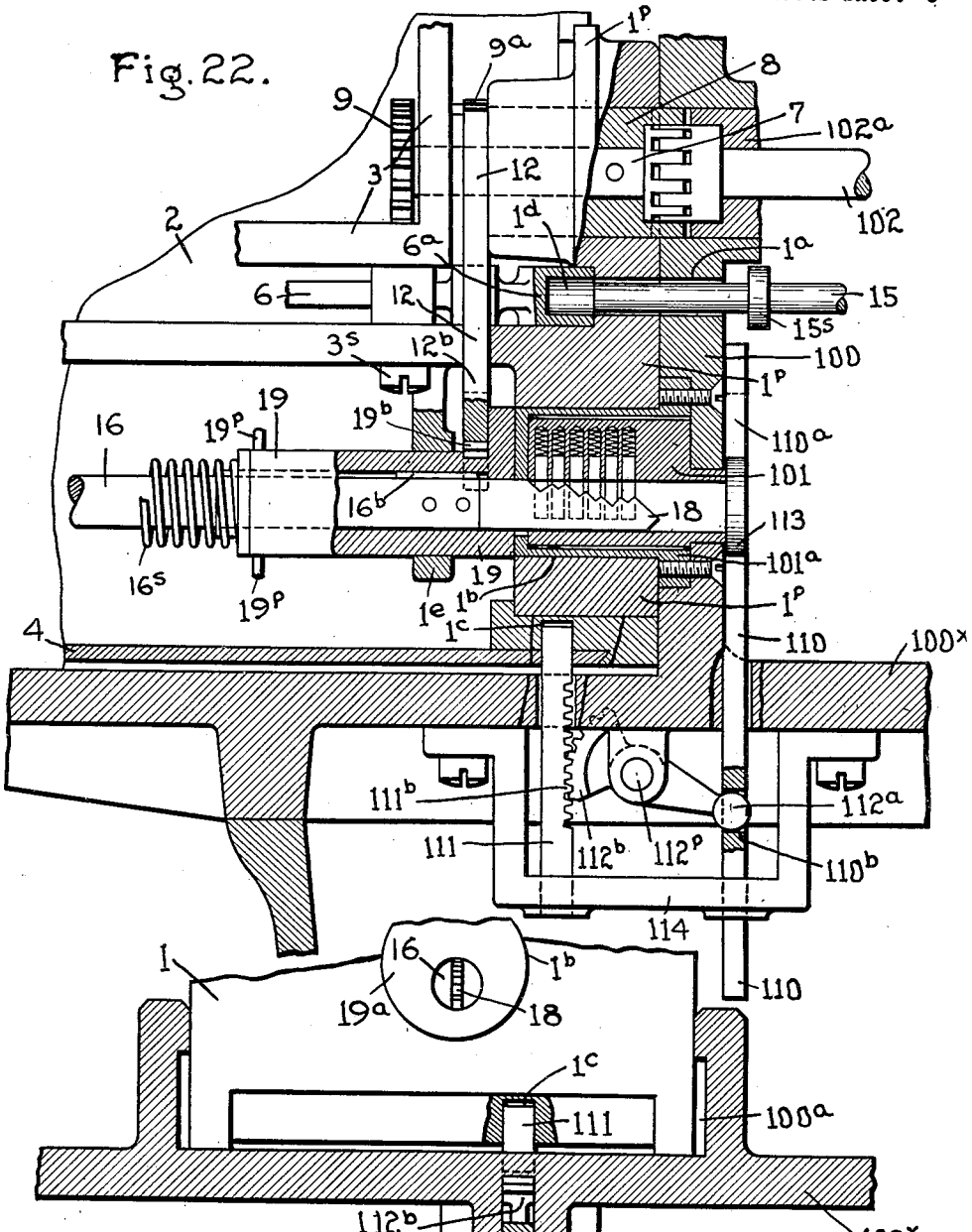

Patented Jan. 24, 1928.

1,657,279

UNITED STATES PATENT OFFICE.

ARTHUR H. PITNEY, OF STAMFORD, CONNECTICUT, ASSIGNOR, BY MESNE ASSIGNMENTS, TO PITNEY-BOWES POSTAGE METER COMPANY, OF STAMFORD, CONNECTICUT, A CORPORATION OF DELAWARE.

POSTAGE METER.

Application filed July 12, 1922. Serial No. 574,427.

This invention relates to means for registering the number of operations of a machine, and is particularly designed for use in the so-called "postage meter" machines of the type shown in my Patents #1,273,793 dated July 23, 1918, Reissue #14,916 dated July 13, 1920, and #1,370,668 dated March 8, 1921.

Such machines are designed for use by persons, firms, or corporations having a large number of letters or packages to mail, to enable such users of the mail to buy any desired amount of prepaid postage from the Government, and print such amount of postage, from time to time, in any quantities and amouts that they desire, until the total amount of postage for which they paid is exhausted, whereupon the machine will become automatically locked so that no further stamps can be printed thereby.

The present invention provides a simple novel detachable meter equipped with a counter, and means for registering the total amount of the various settings or chargings of the meter. Like the Pitney "postage meter" now in use (Patent #1,370,668 March 8, 1921) the meter embodying the present invention can be "charged" or set for use and then used as desired in applying or printing postage up to the predetermined amount, and will then be locked against further operation when that amount is exhausted.

The particular object of this invention is to provide a meter which will register the performance of a "postage meter machine, either by registering the exact number of impressions of a die of fixed denomination, or registering the amount in dollars and cents of that type of postage meter machine which prints stamps of varying denominations. The construction of the meter is essentially the same in either case, the difference being that a meter of this construction applied to the former type of postage meter machine, will lock when the full number of impressions has been made, and the numerals at the sight opening will show an abstract number representing the number of impressions used; but when applied to a machine of the latter type the numerals at the sight opening will indicate dollars and cents, and the meter will lock when the whole number of dollars is exhausted; and may leave an unused balance in cents, which unused fraction of a dollar will be added to the amount purchased at the next setting of the meter, and not lost.

Other objects and advantages of the invention will be hereinafter set forth; and I will explain the invention with reference to the accompanying drawings which illustrate one practical embodiment of the invention, which, however, is capable of various changes in form, construction and combinations of parts within the scope of the invention. An understanding of said machine will enable others to adopt and use the invention for various purposes within the scope of the claims, which set forth the essentials of the invention and the novel features of construction and novel combinations of parts for all of which protection is desired.

In the drawings I have shown the meter and only such parts of a machine with which it is employed as are necessary to an understanding of its use therewith. The printing mechanism of machine to which the meter may be attached may be any one of several types, providing it is equipped with the proper shaft connections, and also preferably with a meter pin whose function is to project into the meter casing at the beginning of each operation of the machine and be withdrawn at the completion of such operation such as shown and described in my Patent #1,370,668. Also preferably the printing mechanism is so constructed that it will not function, if for any reason, the said meter pin is prevented from projecting into the meter at each operation of the printer.

In said drawings:

Fig. 1 is a plan view of the meter.

Fig. 2 is a side elevation thereof.

Fig. 3 is a plan with the case broken away showing the registering mechanism.

Fig. 4 is a vertical section through the case and base showing the interior registering mechanism in elevation.

Fig. 7 is an end view of the meter.

Fig. 8 is a transverse section showing an end elevation of the locking mechanism.

Fig. 9 is a top view of the extreme left hand or highest denomination wheel of the dollar and cents counter as it appears when meter is charged.

Fig. 10 is a sectional view of same on center line.

Fig. 11 is a view of same wheel before charging.

Fig. 12 is a sectional view of Fig. 11 on center line.

Fig. 13 is a sectional view on line 13—13 Fig. 10.

Fig. 14 is a sectional view on line 14—14 Fig. 10.

Fig. 15 is a section on the line 15—15 Fig. 10.

Fig. 16 is a section on the line 16—16 Fig. 12.

Fig. 17 is a sectional view on the line 17—17 Fig. 12.

Figs. 18 and 19 are sections similar to Fig. 17 illustrating the action of the shield and rock lever during the revolution of the numbering wheels.

Figs. 20 and 21 show various readings of the numeral wheels at the sight openings at different steps in the operation of the meter.

Fig. 22 is an enlarged detail sectional view of mechanism for locking the meter on the printer.

Fig. 23 is a detail view showing parts of such parts in section.

Figure 5:
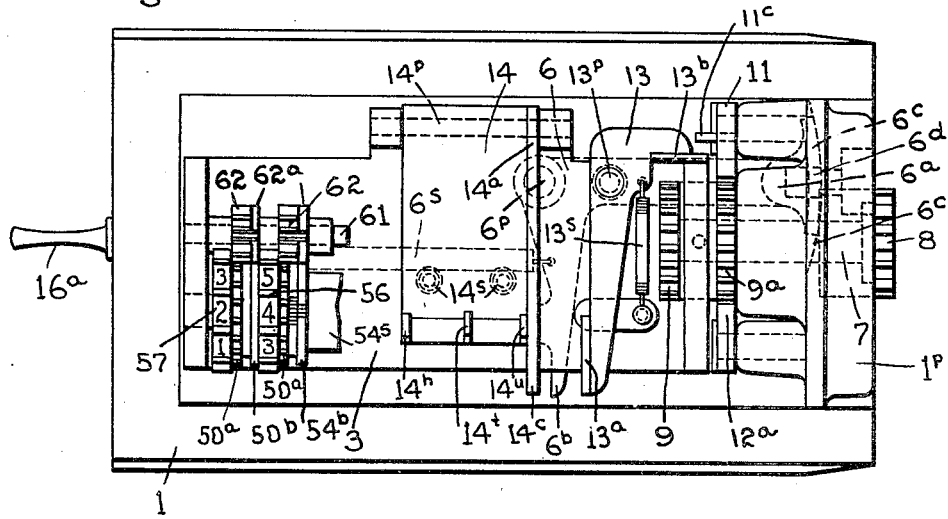
Fig. 5 is a plan view with the casing and the dollar and cents counter wheels removed and showing the locking mechanism.

As shown in the accompanying drawings the meter comprises a hollow base member 1 upon which is mounted a casing 2 enclosing the counting or registering mechanism. The base 1 is formed of a casting approximately rectangular and closed at top and each end but open at bottom; the bottom however being closed after the parts are assembled by a slidable plate 4, which when closed is secured by a spring actuated catch 5 as shown in Fig. 4, so that if the plate is once put in place it can not be removed, as this catch 5 is inaccessible and when it locks the plate can not be withdrawn, except by first drilling through the plate.

The casing 2 may also be cast and is closed at top, sides and ends and secured to the top of the base by screws $2^s$, which screws are inaccessible when plate 4 is in place. One end of the casing 2 has an opening which is fitted to and closed by a projection $1^p$ on the upper side of the base and preferably formed integral therewith as shown, so that access cannot be had to the interior of the casing except through a door $2^a$ which is provided at one side thereof, and is secured when closed, by a lock $2^c$ preferably a Yale lock; so that unauthorized access to the interior of the casing or meddling with the mechanism are prevented. Access to the lock $2^c$ may be further prevented by a cover plate $2^t$ which can be fastened by an ordinary seal $2^v$, as indicated in Figs. 1 and 2, and would have to be broken off before a key could be inserted in the lock; so meddling with the lock by an unauthorized person would be immediately detected.

Journaled in a bore in the part $1^p$ of the base, or in the end of the casing 2, is a shaft 7 to the outer end of which is securely fastened a coupling member 8, hereinafter referred to, and on the inner end of shaft 7, within the casing 2, is fixed a pair of spaced pinions 9 and $9^a$; which may be formed integral and connected by a suitable hub as indicated in the drawings. The inner gear 9 meshes with the gear $50^a$ (see Figs. 3 and 4) attached to the unit wheels 50 of the counting mechanism in the casing as hereinafter described, said counting mechanism being driven by the rotation of the shaft 7.

Within the casing 2 is a frame 3 carrying the registering or counting mechanisms hereinafter referred to. This frame 3 is spaced from the top of the base 1 by distance pieces $3^a$ and fastened thereto by screws $3^s$ which are inaccessible when the plate 4 is in place.

The counting mechanism is preferably of the "geared" type, that is the motion of one of its numeral wheels is communicated to the next numeral wheel of higher denomination by means of intermittently operated gears. The unit wheel 50 is the prime mover of the series. None of the wheels can be turned independently, but each is moved in regular order of progression by means of its gear connection with the unit wheel.

As shown in Figs. 3–8 a series of such numeral wheels 50, 51, 52, 53, 54 are loosely mounted on a spindle 60, supported in the ends of the frame 3. The wheel 50 is the unit wheel of the series and has connected therewith a spur gear $50^a$, and a one tooth gear $50^b$, securely fastened together, and acting as one piece. The gear $50^a$ of the unit wheel 50 meshes with the spur gear 9 on the drive shaft 7 of the meter, consequently any motion of this shaft 7 (which is coupled by coupling 8 to the mechanism to which the meter is applied) will be communicated to the unit wheel 50, and therefrom to the other numeral wheels in order.

In the example shown there are five numeral wheels 50, 51, 52, 53, 54, in the main counting or registering mechanism. Wheel 50 being the "units" or "cents" wheel; 51 the "tens" wheel; 52 the "hundreds" or "dollar" wheel; 53 the "tens of dollars" wheel; and 54 the "hundreds of dollars" wheel, as hereinafter explained. Each of these wheels is provided with a spur gear $50^a$ and one tooth gear $50^b$ either formed integral therewith or secured thereto so that all act as one; similar parts being similarly lettered in the drawings.

Parallel to spindle 60 is a spindle 61 set in the frame 3. Upon this spindle 61 are loosely mounted small pinions 62 each having ten teeth but each alternate tooth is cut or milled away at one end as at 62ª forming 5 "stops" (see Fig. 3). One of these intermediate pinions 62 is placed on spindle 60 adjacent and between each pair of adjacent numeral wheels 50—51; 51—52; 53—54, etc., in such a way that the complete toothed portion of pinion 62 will mesh with the spur gear 50ª of the related numeral wheel of higher denomination, while its stop 62ª will engage the related one tooth gear 50ᵇ of the related numeral wheel of lower denomination (see Fig. 3).

Each one tooth gear 50ᵇ will move its related gear 62, but once during one revolution; and as there are 5 stops in each ten tooth gear 62, such gear 62 is advanced two teeth by and for each revolution of its related gear 50ᵇ, and as each gear 50ª has 20 teeth it follows that any numeral wheel of higher denomination in the series will be advanced 1/10 of a revolution for each revolution of the numeral wheel of next lower denomination.

Thus the numeral wheels will be properly operated in sequence as is required in any consecutive numbering or registering device, and I have provided novel means for locking said registering mechanism against further operation when it has completed its full count, as will be hereinafter explained. The numeral wheels and their carryover devices above described are of well known construction and do not require more detailed explanation or illustration. Further, while I prefer to use this type and construction of registering wheels and carryover devices the invention is not limited thereto, and any other suitable kind of registering wheels and carryover devices could be used.

If in a counter containing 3 numeral wheels it is desired to subtract instead of to add, the wheels should be set to start at zero (000) which in reality is 1000 as the next number in the series is 999 and when so set it will subtract consecutively, a unit at a time, till 001 is reached; then the next count (decrease of 1) will bring all the wheels back to zero again (000) which is actual zero this time, as 1000 has been subtracted from the original count. I have therefore provided means for automatically locking the meter at this point; and when so locked the numeral wheels cannot be shifted until the locking mechanism has been "reset" by hand. The object of this "locking" and "resetting" is hereinafter explained.

The particular meter illustrated in the drawings submitted is designed for use on a machine which prints postage stamps of denominations varying from 1¢ to $1.00 consequently the registering mechanism or counter in this meter should be made to lock when the 3 numeral wheels (52, 53, 54) indicating "dollars" come to their zero (0) positions disregarding the positions of the two wheels 50, 51 which indicate "cents".

To each numeral wheel 52, 53, 54, a disk 50ᵇ is attached, and preferably placed at the left hand side of such wheel, as shown in Figs. 4 and 5. Each disk 52ᶜ, 53ᶜ, 54ᶜ, has a radial slot 54ᵈ in its periphery to admit the related tooth (14ᵘ, 14ᵗ, 14ʰ) of a locking member 14 hereinafter described.

The locking member 14 is pivoted at one end on a rod 14ᵖ between two upwardly projecting lugs on the floor of the counter frame 3 (see Figs. 3, 6) and the end of said member is normally pushed upward by springs 14ˢ set into sockets in the floor of the frame 3. The outer or free end of this locking member 14 is provided with a series of upwardly projecting teeth 14ᵘ, 14ᵗ, 14ʰ (see Figs. 4 and 6) respectively positioned so as to engage with the disks, 52ᶜ, 53ᶜ, 54ᶜ, attached to the respective numeral wheels 52, 53, 54, (see Fig. 4). Formed on or attached to one side of the locking member 14 is a plate 14ª (Figs. 3 and 5) the outer end 14ᶜ of this plate projecting towards the door 2ª of the meter casing and forms a convenient handle by which the locking member 14 can be depressed by hand, to disengage its teeth from the disks, when resetting the meter. Said plate 14ª also has a downwardly extending portion 14ᵇ which extends through a slot in the floor of the counter frame 3 into the space between the floor of the counter frame 3 and the top of the base 1 to arrest the meter locking lever 6 hereinafter referred to.

The teeth 14ʰ, 14ᵗ, 14ᵘ of the locking member 14 vary in length relative to the disks 54ᶜ, 53ᶜ, and 52ᶜ with which they make engagement. The tooth 14ʰ which engages the disk 54ᶜ will bear on disk 54ᶜ and hold teeth 14ᵗ, and 14ᵘ clear of their disks 53ᶜ and 52ᶜ (Fig. 4) until tooth 14ʰ, enters the slot 54ᵈ in disk 54ᶜ, then the tooth 14ᵗ, the next in length, will bear on the disk 53ᶜ, and holding tooth 14ᵘ clear of disk 52ᶜ until tooth 14ᵗ enters the slot in disk 53ᶜ; then the tooth 14ᵘ bears on disk 52ᶜ until it enters the slot in disk 52ᶜ. Thereupon (there being no further obstruction) the three teeth 14ʰ, 14ᵗ and 14ᵘ enter their respective slots to the full depth and lock the respective numeral wheels at zero.

When the three numeral wheels all show zero at the sight opening the teeth 14ʰ, 14ᵗ, 14ᵘ of the locking member 14 are all seated in the slots in the disks 54ᶜ, 53ᶜ, and 52ᶜ respectively.

When the meter is to be "reset" or "charged" the locking member 14 is pulled down by hand, to disengage the teeth from the disks and release the wheels for further action; and as the numeral wheels 54, 53, 52 cannot be moved by hand the locking member 14 would spring back into engagement with the slots 54$^d$, 53$^d$, and 52$^d$ again, upon releasing the hand pressure on 14, if no obstacle to the teeth 14$^h$, etc., entering the slots intervened; I therefore provide means to prevent the locking member reengaging the numeral wheels after they are released thereby, until the meter has again performed its full cycle of operations. For this purpose I provide a shield 55 (Figs. 3, 4, and 9-12) which, in the form of a ring, is slidably mounted on the unit of which the numeral wheel 54 forms a part.

Figs. 9 to 12 show in detail the construction of the unit of which wheel 54 forms a part, and which unit consists of the spur gear 54$^a$, numeral wheel 54, disk 54$^c$, sleeve 54$^s$, and a one-tooth gear 54$^b$ all of which are formed or rigidly fastened together and operate as one piece. The sleeve 54$^s$ has an annular flange 54$^e$ upon the periphery of which a figure "1" is engraved or marked in line with the "0" mark on the wheel 54, (see Figs. 9-11). A ring 55 is loosely mounted on sleeve 54$^s$ between flange 54$^e$ and disk 54$^c$, said ring being preferably exteriorly knurled to facilitate its being turned by hand. This ring has an annular portion 55$^a$ on its side surrounding the periphery of flange 54$^e$, and in this flange is a notch 55$^c$ to permit the numeral "1" on flange 54$^e$ to be exposed to view when the ring is turned to bring the notch over the numeral, as in Fig. 9. The ring 55 also has a lug 55$^b$ (see Fig. 10) on its side opposite the part 55$^a$ which lug projects over the periphery of the disk 54$^c$, this lug 55$^b$ being large enough to completely cover the slot 54$^d$ in the disk 54$^c$, when in register therewith (Fig. 14) leaving the rest of the periphery of disk 54$^c$ exposed. (See Fig. 12.) A short segmental slot 55$^s$ is formed in the inner side of the ring 55, see Fig. 15, and is engaged by a pin 54$^p$, projecting from the sleeve 54$^s$. This pin and slot limit the extent of rotatorial movement of the ring 55 on sleeve 54$^s$, so it can be moved just sufficient to cause lug 55$^b$ to cover and uncover the slot 54$^d$, and notch 55$^c$ to expose or hide the numeral 1 on flange 54$^e$. The notch 55$^c$ and the lug 55$^b$ are so positioned with relation to the disk 54$^c$ and flange 54$^e$ that the numeral 1 on the flange is only exposed to view when the lug 55$^b$ covers the slot 54$^d$.

Fig. 11 shows the appearance of the "hundred dollar" unit looking down from the dial side of the meter case, just before charging or "setting" the meter, at which time the numeral 1 on flange 54$^e$ is hidden by the rim 55$^a$ of the ring 55. Then the meter is charged or set. The numeral 1 is exposed through the notch 55$^c$ as in Fig. 9.

When the wheel 54 is revolved 1/10 of a revolution the friction of the ring 55 on the sleeve 54$^s$ may not cause ring 55 to turn with it, or, on the other hand, the pressure of the tooth 14$^h$ on the lug 55$^b$ may cause the ring 55 to stand still; but in either case the numeral 1 on flange 54$^e$ will be removed from sight on the dial or at sight opening, and the next time the wheel 54 is turned 1/10 of a revolution, the ring will be forced to move with the flange 54$^e$ by the pin 54$^p$ in slot 55$^s$ (Fig. 15) contacting with the end wall of the slot 55$^s$ in ring 55, and forcibly moving the lug 55$^b$ out of the way of the tooth 14$^h$, and tooth 14$^h$ then contacts directly with the periphery of the disk 54$^c$ (see Fig. 18) and even if the ring 55 (which now "floats" loosely on the part 54$^s$) should be moved by vibration or other cause, the lug 55$^b$ cannot again come between the flange 54$^e$ and the end of the tooth 14$^h$.

Fig. 14 shows the lug 55$^b$ covering the slot 54$^d$ in disk 54$^c$ with tooth 14$^h$ pressing upon it. Fig. 18 shows the disk near the completion of a revolution of the numeral wheel, and the lug 55$^b$ fallen or jarred down so that it again covers the slot 54$^d$. Fig. 19 shows the disk 54$^c$ still further advanced and illustrates how the point of tooth 14$^h$ will push the lug 55$^b$ out of the way until it can enter the slot as illustrated in Fig. 17.

*The counter locking devices.*

Figure 6:
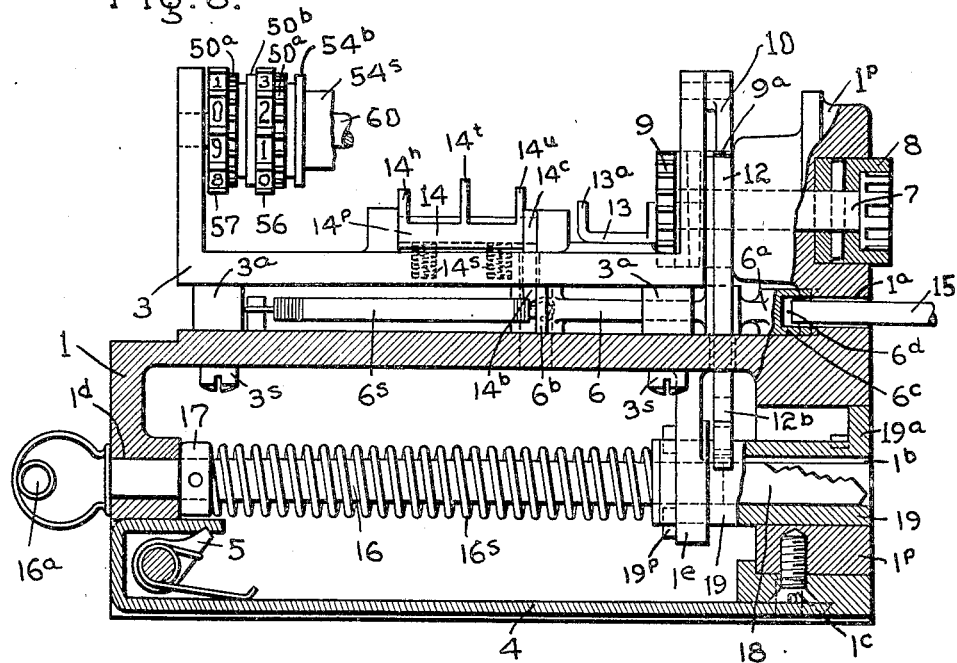
Fig. 6 is a side view of Fig. 5 with the base in section.

To prevent shaft 7 or gear 9 being turned backward so as to reverse the movement of the counter numeral wheels and improperly alter the count registered thereby, a pawl 10, Figs. 4, 6, 8, is pivoted on the end of the frame 3, beside the gear 9$^a$, and is normally held in engagement with said gear by a spring 10$^a$, thus effectually preventing any backward movement of the shaft 7.

To prevent any unauthorized shifting of or tampering with the numeral wheels of the counter, or improper rotation of the shaft 7, a catch 11 is pivoted at 11$^p$ on the inside back wall of the meter and is normally urged into engagement with the teeth of the gear 9$^a$ by a spring 11$^s$, and is only prevented from taking this position by reason of its lower arm 11$^b$ resting on the shutter lever 6$^a$ (Fig 8) hereinafter referred to. This catch 11 engaging gear 9$^a$ prevents its rotation in one direction while pawl 10 prevents rotation of gear 9$^a$ in the opposite direction. Catch 11 is not designed to prevent shaft 7 from being turned when meter is removed from the machine, but is a part of the counter locking device, and is only engaged with gear 9$^a$ when the numeral wheels 52, 53 and 54 are locked at zero. Catch 12 is the one that engages 9$^a$ each time meter is removed.

For the purpose of disengaging the latch 11 from the gear 9$^a$, when charging the meter (as described later on) a two armed lever 13 (see Figs. 5 and 8) is pivoted on the floor of the counter frame at 13$^p$ and provided with a spring 13$^s$ which holds the short arm 13$^b$ of the lever normally tightly against an adjacent part of the counter frame 3; and the long arm 13$^a$ of the lever projects beneath the counter wheels, toward the door of the case 2. When arm 13$^a$ is moved toward the right (Fig. 5) the short arm 13$^b$ is moved away from the frame 3 and will engage a pin 11$^c$ attached to the catch 11, and thereby move catch 11 out of engagement with the gear 9$^a$.

Below the counter frame 3, in the space provided by the distance pieces 3$^a$ is a two-armed lever 6, (see Figs. 6 and 8) pivoted on a stud 6$^p$ and connected with a spring 6$^s$. The longer arm 6$^a$ of this lever 6 extends back toward the wall 1$^p$ of the casing and its extremity is flared out in the form of a sector 6$^c$, centered at the stud 6$^p$. The inside of the wall of the casing base 1, is preferably concaved to fit the convex head 6$^c$ of the lever arm 6$^a$ and allow it to oscillate freely on its pivot 6$^p$. In the head 6$^c$ is drilled a hole 6$^d$, adapted, in a certain position of lever 6, to register with a hole 1$^a$ drilled in the inner wall of base 1. When lever 6 is oscillated, hole 6$^d$ in head 6$^c$ is alternately moved into and out of register with hole 1$^a$ and therefore cause head 6$^c$ to alternately obstruct and allow free passage to a pin 15 (see Figs. 4 and 6) projecting into hole 1$^a$ and endeavoring to enter the hole 6$^p$ in the head 6$^c$, said head thus constituting a shutter for the hole 1$^a$.

The arm 6$^b$ of the lever 6 extends at a right angle to the arm 6$^a$ toward the door of the meter case 2, its extreme end (see Fig. 5) forming a convenient handle for moving it, when charging the meter. To this arm 6$^b$ is connected the spring 6$^s$ which urges it toward the left, but is normally prevented from so moving it by the interposition of the projection 14$^b$ on the locking member 14. (See Figs. 4 and 6.)

When the shutter lever 6 is so positioned that its short arm 6$^b$ rests against the projection 14$^b$ of locking member 14, the hole 6$^d$ in the head 6$^c$ is directly in line with the hole 1$^a$ in the base 1; so that the pin 15 see Figs. 4 and 6) can enter hole 6$^d$. If however, the projection 14$^b$ is removed as by the raising of the locking member 14, then the spring 6$^s$ will cause the shutter lever 6 to rock on its pivot 6$^p$ and the holes 6$^d$ and 1$^a$ will not register and pin 15 cannot enter hole 6$^d$, and the meter cannot then be effectively operated until reset.

*The total register.*

To the left of the subtracting counter above described, and suitably spaced therefrom is the "total" register. This is preferably composed (as shown) of two numeral wheels 56 and 57 (Figs. 3–6) mounted on the spindle 60 and receiving their motion directly from the last or highest order numeral wheel of the above described counter. In forms of the construction shown the total register is in fact a duplicate of parts of the first counter, but the total register numeral wheels are arranged to add instead of subtract, and the total register shows the sum of the different settings of the subtracting counter.

As shown in the drawing the numeral wheel 56 has a spur gear 50$^a$ having one tooth 50$^b$ adapted to coact with an intermediate pinion 62 which is operated by a one tooth gear 54$^b$ on the sleeve 54$^s$; and motion is transmitted from the unit carrying wheel 54 to the wheel 56 and from the latter to wheel 57 by the same means and in the same manner that motion is transmitted from a numeral wheel of lower denomination to the numeral wheel of the next higher denomination in the subtracting counter as above descibed; and similar parts being similarly lettered in the drawings, it is unnecessary to enter into a detailed description of the construction and operation of the total register. The numbers on the numeral wheels in the total register however are arranged reversely to the numbers on the wheels in the subtracting counter; so that while the latter starts at the highest number (1000) and subtracts until the zero is reached, the total register will start at zero and add until its highest number is reached.

As above stated and as shown the units wheel 56 of the total register is directly geared to or driven by the hundreds dollar wheel of the subtracting counter. Therefore as it is directly geared to the "hundreds dollar wheel" the numeral wheel 56 makes $\frac{1}{10}$ revolution to one of the wheel 54, and as the subtracting counter (in the construction shown) has to be reset for each $1000.00 it follows that the total register will register or add one unit thereon every time the subtracting counter completes its full quota of operations, at which time the meter will become locked against further effective operations, until it is reset or charged. In practice the meter is charged for a definite amount at each setting ($1,000.00 in the meter shown). Therefore, the reading of the total register will show the number of times the meter has been charged or reset, and this total multiplied by 1000 (in the meter shown) will show the total amount of postage in dollars which the owner of the meter has paid for.

*Operation of the counter and register.*

As stated, the meter is designed to be removably attached to a machine to register the number of operations thereof and the meter shown is particularly adapted to be attached to a machine of the type shown in my patents #1,273,793 and #1,370,668, or other machines of like general character. The particular machine to which this meter is applied is not shown herein but it forms no part of the present invention and will not be described or illustrated herein except such parts thereof as may come in operative connection with the meter when the latter is properly positioned in the machine. It will suffice to state that such machine is provided with a printing mechanism, with a meter pin 15 and driving connection, and a lock adapted to function as hereinafter described.

When the meter is used in connection with such a machine the meter is supposed to be taken to the Post Office Department and (if the meter has a subtracting counter as shown) the owner purchases one thousand dollars' worth of postage and the postoffice official will set the subtracting meter to show the full amount of $1000 at the sight opening. The postoffice official then seals the meter and when so set the meter can be replaced on the machine and the latter operated, as desired, until practically the full amount of $1000 postage has been used by printing stamps to that amount by successive operations of the machine. The subtracting counter cannot be operated unless the meter is in place on the machine, as when removed therefrom the meter is automatically locked as hereinafter explained. When the meter is in place on the machine, the unit wheel of the subtracting counter will be operated for each operation of the machine. Of course it is obvious that if it is desired to have the meter set for a larger amount of postage more numeral wheels would have to be used in the subtracting counter. If it is desired to have a less amount of postage sold for each setting, less numeral wheels could be employed in the subtracting counter. In the example shown five numeral wheels are used in the subtracting counter and therefore $1000 worth of postage is presumed to be purchased at each setting of the meter. In the example shown the counter is of the geared type and its numeral wheels cannot be moved independently either by accident or design. This capacity is governed by the number of figure wheels in the counter, each additional wheel after the first increasing the capacity ten times; for instance, 5 wheels would have a maximum capacity of $999.99 but by utilizing the 5 ciphers as they come into position the real capacity of the counter is equivalent to $1000.00—the figure 1 not appearing. To provide for this contingency the figure 1 is engraved at a certain point on the periphery of the extension or hub of the last wheel 54 of the counter and which automatically becomes visible upon moving the lug 55$^b$, against which the last tooth 14$^h$ (to the left) on the locking comb rests, down each time the meter is recharged.

As the five ciphers turn over the five 9's appear instead, the figure 1 just mentioned disappears beneath the circular shield and a figure 1 appears on the units wheel of the ascending counter to the left. This auxiliary counter operates in an ascending series and its only function is to indicate the number of times the dollar and cents counter has been set to capacity and at the same time indicate the total amount of money paid for postage to date, the figures on the dollars and cents counter always indicating the amount of money still available before the meter locks. For instance, if the total register has two wheels and the dollars and cents counter has five wheels, and the meter has been set or recharged 23 times it would show that the mailer had paid $23,000 to date, and still had to his credit in the meter whatever amount might be shown on the subtracting counter. In other words, the total register would have a capacity of showing up to 99 separate and successive purchases of $1000 worth of postage at each purchase.

If the subtracting or dollars and cents counter had only 4 wheels two of them representing cents, and the total register had two wheels and read 23 it would mean that the meter had been reset 23 times for the capacity of $100 each—this would be the same as saying the mailer had paid for $2300 worth of postage to date with whatever balance might be indicated. In other words, the total register not only indicates the number of times the meter has been "set" but also the total amount in dollars of the postage paid for.

With a geared counter and suitable connections it would be possible to print any denomination of stamp desired—with greater ease and positive action than with a ratchet counter of either the external or internal type of movement and subtract the amount of postage used at each operation from the total appearing at the "sight" opening of the subtracting counter.

*Operation of "charging" or setting the meter.*

The meter is originally set at zero; the numeral wheels all showing "00" at the "total" sight opening and "000.00" at the subtracting counter ("dollar and cents") sight opening. The teeth of the locking comb 14 will then be fully engaged with the notched disk wheels 54, 53, and 52, and the hole 1$^a$ in the back wall of the meter will be closed by the shutter lever head 6$^b$ and the catch 11 engaged with the gear 9$^a$; in other words, the meter and counters will be effectually locked against operation.

Upon opening the door 2$^a$ of the case 2, the three levers 13$^a$, 6$^b$, and 14$^c$ and the knurled ring 55, are accessible. The lever 13$^a$ is then moved to the right causing its short arm 13$^b$ to engage the pin 11$^c$ and push the catch 11 out of engagement with the teeth of the gear 9$^a$, and lifting its lower arm 11$^b$ clear of the path of the shutter lever arm 6$^a$. Next the arm 6$^b$ of lever 6 is moved to the right, this will cause the shutter arm 6$^a$ to move head 6$^b$ into the position where its hole 6$^d$ lines up with hole 1$^a$ in the wall of the meter. Next, by means of the handle 14$^c$, the locking member is moved downward disengaging the teeth 14$^h$, 14$^t$, and 14$^u$ from the slots in the disks of numeral wheels 54, 53, 52; and this downward movement of locking member 14 causes its projection 14$^b$ to extend below the counter frame 3 and prevents the lever 6 from being returned to normal position by its spring 6$^s$. Finally the knurled ring 55 is turned so as to cause lug 55$^b$ to cover the slot 54$^d$ in the disk 54$^c$ of wheel 54 and prevent the re-entry of the tooth 14$^h$ of the locking member 14 into said slot and hold the locking member depressed against the action of its springs 14$^s$, and the teeth 14$^t$ and 14$^u$ will also be held clear of the slots in their related disks. The turning of the ring 55, to cause lug 55$^b$ to cover the slot 54$^d$, moves the notch 55$^c$ to position to expose the "1" engraved on the periphery of the flange 54$^e$ (see Fig. 9). The subtracting counter numeral wheels will now show 1000.00 at the sight opening. (See Fig. 20). This figure "1" appearing at the sight opening (see Fig. 1) is proof that the meter has been properly "set"; it also shows that $1000 in postage has been paid for and can be used instead of leaving it to be inferred, as would have to be the case if only "000.00" appeared at the sight opening of the subtracting counter after the "setting" or charging; the dial would also read exactly the same both before and after charging, if it were not for the introduction of the extra figure "1" just mentioned and as shown in Figs. 1, 9, and 11.

*The automatic locking of the meter.*

When the meter is operated the first unit of one cent will subtract 1 from the $1000.00 shown on the dial. This means that all five figure wheels will be moved 1/10 revolution and will read 999.99 (see Fig. 21) the flanges 54$^e$ being connected with the numeral wheel 54, will also revolve 1/10 revolution moving the figure 1 engraved upon it, out of sight on the dial. The unit wheel 56 of the "total" register will also be moved 1/10 revolution hiding the 0 and bringing the 1 into view on the dial. The reading at the sight opening of the total register will then be "01" and at the sight opening of the subtracting counter will be 999.99 (see Fig. 21).

When the numeral wheel 54 has been turned until the tooth 14$^h$ enters the slot 54$^d$ the next tooth 14$^t$ of the locking member 14 rests on the periphery of the disk 54$^c$ of numeral wheel 53 and will enter the slot 53$^d$ therein the next time it registers therewith, which will be when the subtracting counter shows 009.99.

The last tooth 14$^u$ will now rest on disk 52$^c$ and when the slot 52$^d$ therein registers with the tooth 14$^u$, which will happen when the dial reads 000.99 or less all obstructions will be removed and all the teeth 14$^h$, 14$^t$, and 14$^u$ will enter their respective slots to the full depth and the locking member 14 will rise to its limit, drawing up with it the downwardly projecting lug 14$^b$.

When the lug 14$^b$ is drawn up out of the way of lever 6 spring 6$^s$ would oscillate the shutter lever 6 on its pivot 6$^p$, but is prevented from immediately so doing by reason of the meter pin 15 being at the moment entered in the hole 6$^d$ of the head 6$^b$ of shutter lever arm 6$^a$ of said lever, said pin 15 as hereinafter explained, being only withdrawn from the meter at the completion of the then occurring printing operation of the machine to which the meter is attached. But as soon as pin 15 is withdrawn, the lever 6 is moved by spring 6$^s$ throwing the hole 6$^d$ out of register with the hole 1$^a$ in the end wall of the meter, so that pin 15 cannot again reenter it. Also when lever 6$^a$ is thus rocked, the lower arm 11$^b$ of catch 11, which was upheld by the lever arm 6$^a$, is released, and the catch is rocked by its spring 11$^s$, and its upper arm 11$^a$ brought into engagement with the gear wheel 9$^a$, thus locking the drive shaft 7 of the meter, and the hole 1$^a$ being closed, the meter pin 15 cannot enter again; and until it can again enter the related printing mechanism (or other operative mechanism) to which the meter is applied, is also rendered ineffective until the meter is removed, reset, and replaced therein.

*Auxiliary key controlled locking mechanism.*

In addition to the automatic counter controlled locking mechanism above described, I provide another meter lock controlled by a key. This is desirable because the meter may be detached from the printing mechanism at a time when it is charged, in which event the drive shaft 7 could be turned forwardly by hand, by means of the coupling 8, although it could not be turned backwards and made to undo the count it had already made, because the pawl 10 within the meter prevents any backward movement of the driving shaft 7; but shaft 7 might be turned in a forward direction, because the catch 11 is not then meshed with gear 9$^a$ unless and until the subtracting counter has completed its cycle of operations, as above described. It is also desirable to provide such connection between the meter and the printer or machine with which the meter is used, as will positively prevent such machine from being effectively used, unless the meter is properly connected with it to register its operations. To meet these two requirements the printer (or machine with which the meter is used) is provided with a key operated lock, the key to which is contained within, and is inseparable from, the meter and necessitates the proper placing of the meter in or on the machine in order to release the printer for operation.

As above stated the meter is designed to be removably attached to a machine to register the number of operations thereof; and the meter shown is particularly adapted to be attached to a machine of the type shown in my Patent #1,370,668 and other machines of like general character. Such machine is not shown herein, as it forms no part of the present invention, and I will only refer to such parts thereof as come into direct operative connection with the meter when the latter is properly positioned in the machine.

The frame 100 of the printing mechanism is provided with a groove 100ª (see Figs. 22 and 23) into which the meter is pushed, end first, until the coupling 8, on the shaft 7, meshes with a coupling 102ª on a shaft 102 of the printing mechanism (see Fig. 4).

As shown in Figs. 4 and 22 a cylindric lock casing 101ª is attached to a part 100 of the printing mechanism or machine and at the point where the meter is to be placed in said machine, and projecting into the space to be occupied by the meter. In casing 101ª is a cylinder lock 101 (Figs. 4 and 22) which is completely closed exteriorly except the key hole, by the casing 101ª which is securely fastened to the frame 100 in such manner that the fastenings will be inaccessible. The functions of this printer lock are (1) to secure the meter pin 15 in its inner position; and (2) to secure the meter in position on the printer. And these functions are performed alternately, that is, when the meter pin is secured, the meter is released; and when the meter is secured the meter pin is released. The arrangement of the bolts of this lock are not part of the present invention and are merely indicated in the drawings sufficiently in connection with the description to impart a clear understanding thereof.

A hole 1ᵇ is bored through the end wall 1ᵖ of the meter (Figs. 4, 22, and 23) to admit the projecting lock casing 101ª, which casing enters said hole in the meter when the latter is pushed into proper operative position on the machine.

Another hole 1ᵈ is bored in the front wall of the meter base in line with hole 1ᵇ but its axis is 3/16 of an inch below the axis of hole 1ᵇ.

A key shaft 16 is placed in the base, one end thereof passing through the hole 1ᵈ and its other end extending toward the hole 1ᵇ, and is slidably mounted in a sleeve 19 which is slidably supported in a bracket 1ᵉ in the base, as shown in Figs. 4, 6, 22. The rod 16 is keyed to the sleeve, as at 16ᵇ, and a lock key 18 is fastened to the end of rod 16 and projects into the bore of the sleeve, as indicated in Fig. 4 when the meter is removed from the machine. The sleeve is therefore forced to turn with the rod 16 though it may move thereon in the direction of its axis. The part 1ᵉ acts as an alignment guide, and support for the sleeve 19, and rod 16. On the outer end of sleeve 19 is an eccentric circular cam 19ª, the center of which is 3/16 of an inch from the center of the sleeve. In one position of the sleeve the cam will be in line with the hole 1ᵇ which it is designed to enter. (See Figs. 6 and 22.) A spring 16ˢ is placed on rod 16 between the sleeve 19 and the collar 17, and normally pushes the sleeve outward until the outer surface of the cam 19ª is flush with the outer side of the rear wall of the meter base 1 (Fig. 6) the outward movement of the sleeve being limited by the pins 19ᵖ thereon contacting with the support 1ᵉ (see Fig. 6).

A collar 17 pinned fast to rod 16 together with the thumb grip 16ª take the end thrust of the rod 16 in both directions preventing its being moved in or out but allowing it to be turned. The thumb grip 16ª furnishes a convenient handle by which to turn the rod 16.

The sleeve 19, of course, is manually turned by turning the rod 16. To prevent operation of the register wheels when the meter is removed from the machine, and until and unless the machine lock 101 has been properly unlocked, I provide a third means for engaging and locking the gear 9ª. This consists of a double arm lever having an upper arm 12 provided with a tooth, adapted to mesh with the gear 9ª (see Figs. 3, 4, and 8) to prevent turning of the gear or the drive shaft 7 in either direction.

The lower arm 12ᵇ is cut with a tooth space 12ᶜ and two stops 12ᵈ, 12ᵉ (Fig. 8) after the manner of an intermittent gear "follower" and is operated by a tooth 19ᵇ on sleeve 19, shifting it from one to the other of its two positions, bringing the upper arm 12 either into or out of mesh with gear 9ª as required.

The projecting tooth 19ᵇ on the sleeve is designed to operate the lever 12 by engaging the tooth space 12ᶜ in the end of the lower arm 12ᵇ when the sleeve 19 is in its innermost position (Figs. 4 and 22) and move it according to the direction in which the shaft 16 is turned, so that one or the other of the stops 12ᵈ, 12ᵉ will rest on the cylindrical portion of sleeve 19.

The key 18 is situated within the back wall of the meter and is normally covered and protected by the sleeve 19, which surrounds it when the meter is off the printer (as shown in Fig. 6). This key 18 is constructed to fit but one machine lock 101 so that the meter must be used with the related machine having such lock.

In the bottom of the meter below opening $1^b$ is a hole $1^c$ to receive a bolt 111 which serves to secure the meter in place on the machine, when it is properly applied thereto.

A bolt 110 is preferably mounted on the inside of the wall 100 of the machine to which the lock casing $1^a$ is attached, and when the bolt is raised its upper end is adapted to enter between the wall 100 and a collar $15^s$ on the meter pin 15 and prevent the latter being projected into engagement with the hole $6^c$ (Fig. 6) in the lever 6. A locking lever 112 is pivoted at $112^p$ on a part $100^x$ of the machine to which the meter is attached (Fig. 22). As shown, lever 112 has a rounded end $112^a$ engaging an opening in the bolt 110, and this bolt is guided in a suitable opening in the part $100^x$ and in a bracket 114 attached to the part $100^x$ (Figs. 22 and 23). On the other end of lever 112 is a toothed segment $112^b$ which meshes with a rack $111^b$ on the bolt 111, which is guided in openings in the part $100^x$ and in the bracket 114, and the upper end of this bolt 111 is adapted to be projected into the hole $1^c$ in the bottom of the meter base 1 (see Figs. 22–23). Bolt 110 is moved up or down by means of the machine lock 101, the cam 113 of lock 101 acting on bolt 110 in exactly the same way as the cam $19^a$ acts on its related bolt $12^b$. Motion is communicated to lever 112 by bolt 110, the bolt 110 being the moving power. When bolt 110 is raised bolt 111 is lowered, until its upper end is flush with the top of the part $100^x$ of the machine upon which the meter is placed. Downward motion of bolt 110 will through lever 112 impart an upward movement of the bolt 111, and vice versa. When lock 101 is turned to release the meter it raises bolt 110 by means of cam 113, and simultaneously disengages the bolt 111 from the meter, and the meter pin 15 will then be prevented by bolt 110 from engaging the socket in lever 6, as the upper end of bolt 110 enters between the collar $15^s$ and the wall 100. When lock 101 is turned to secure the meter in position the bolt 110 is lowered withdrawing its end from between the shoulder $15^s$ and the wall 100, thus releasing the meter pin 15 and simultaneously bolt 111 is raised into engagement with the hole $1^c$ in the meter base.

The operation of the combined meter and machine locking devices is as follows: In pushing the meter into place on the machine the coupling 8 of the meter engages the coupling $102^a$ of the machine (Figs. 4 and 22). The meter rod 15 enters the hole $1^a$ of the meter to within a short distance of the end of the shutter lever $6^a$, and the lock cylinder 101 and its casing $101^a$ enters the hole $1^b$ of the meter, pushing the sleeve 19 inward until the eccentric flange $19^a$ clears the hole $1^b$, and key 18 enters the cylinder 101 of the lock and lines up its pin tumblers (Fig. 22). The rod 16 can then be turned to operate the bolt 111 within the hole $1^c$ in the meter (Figs. 22 and 23), thus locking the meter in place on the machine. It requires one full turn of the rod 16 to so operate the the lock 101, and as sleeve 19 turns with the rod and tooth $19^b$ on the sleeve engages and shifts the catch $12^a$ out of engagement with the gear $9^a$ thereby releasing the meter drive shaft 7 so that it can be turned by the shaft 102 of the printer. The meter is then ready for action, provided it has been set, or charged, as above described.

To remove the meter from the machine the rod $16^a$ is turned in the reverse direction, thereby turning sleeve 19 and causing the return of catch $12^a$ into mesh with gear $9^a$, the withdrawal of bolt 111 from the hole $1^c$, releasing the meter, and the locking of meter pin 15 so that it cannot reenter the hole $6^d$ in lever 6. The sleeve 19 is also forced outward by spring $16^s$ entering cam $19^a$ in the hole $1^b$; as in Fig. 6.

The meter can then be removed from the machine; but the rod 16 cannot be turned when the meter is removed because the cam $19^a$ being eccentric to the axes of sleeve 19 and rod 16 will bind against the wall of the hole $1^b$. The cam $19^a$ might be pressed into the meter by hand, or other means, while the meter is off the machine, and the rod $16^a$ could then be turned to cause lever 12 to release the drive shaft 7; but if this should happen by accident, or even be designedly done, the shaft 7 would still be locked by the pawl 10 against any reverse movement and therefore the meter could not be made to alter the count already registered.

What I claim is:

1. A meter for registering the operation of a related machine which has a projecting lock adapted to enter a corresponding hole in the meter when the meter is positioned on the machine; said meter having a hole to receive the lock on the machine when the meter is placed in position thereon; and means for operating the lock after it is entered into said hole.

2. In combination with mechanism as set forth in claim 1, devices operable by said lock for locking the meter in position when the meter is in place on the machine.

3. In mechanism as set forth in claim 1, numeral wheels in the meter, and means whereby the numeral wheels are locked when removed from the machine and whereby the numeral wheels are released when the meter is in position on the machine, said means being operable by the lock operating means.

4. In mechanism as set forth in claim 1, a member adapted to close the hole in the meter when it is removed from the machine, and adapted to be pushed inwardly by the lock when the meter is placed in position on the machine.

5. A meter for registering the operation of a related machine having a projecting lock adapted to enter a corresponding hole in the meter when the meter is positioned on the machine; said meter having a hole or recess adapted to receive the lock on the machine when the meter is placed in position thereon; a registering mechanism in the meter, and devices for locking and releasing the registering mechanism operable after the entry of said lock into said hole while the meter is in position in the machine.

6. In mechanism as set forth in claim 5, a member normally closing the hole in the meter when it is removed from the machine and adapted to be pushed inwardly by the lock on the machine when the meter is placed in position thereon.

7. A meter for registering the operation of a related machine which has a projecting lock adapted to enter a corresponding hole in the meter, and a reciprocable pin adapted to enter the meter when the meter is properly positioned on the machine; said meter having a hole adapted to receive the lock on the machine when the meter is placed in position thereon, and means for operating said lock when it is entered into the meter, and devices operated by said means to lock the meter in place and to permit the pin to enter the meter, and to release the meter and prevent the pin entering the meter when the meter is to be removed, substantially as described.

8. In mechanism as set forth in claim 7, numeral wheels in the meter and means whereby the numeral wheels are locked when removed from the machine and whereby the numeral wheels are released when the meter is in position on the machine, said means being operable by the lock operating means.

9. A meter for registering the operation of a related machine having a projecting lock adapted to enter a corresponding hole in the meter, and a reciprocable pin adapted to enter the meter when the meter is properly positioned on the machine, said meter having a hole adapted to receive the lock on the machine when the meter is placed in position thereon, a registering mechanism in the meter, and means for locking the registering mechanism when the meter is removed from the machine, and devices for releasing the registering mechanism operated by the entry of said lock into said hole, substantially as described.

10. A meter case provided with a hole in one end, a registering mechanism in the case, an oscillating lever for locking or unlocking the said mechanism, a slidable sleeve adapted to enter said hole, a rod on which said sleeve is splined, a spring for normally projecting the sleeve into the hole, and means whereby when the sleeve is turned, the registering mechanism may be locked and unlocked.

11. A meter for registering the operation of a related machine having a projecting lock adapted to enter a corresponding hole in the meter when the meter is positioned on the machine; said meter casing having a hole adapted to receive the lock on the machine, a registering mechanism in the meter casing, a sleeve in the meter entering said hole, a rotatable rod in the meter engaging said sleeve and having a key on its end in the sleeve adapted to engage and operate the lock when the latter is entered into said hole, a lever and connections for locking and unlocking the registering mechanism, said lever being oscillated by the turning of the sleeve.

12. A meter having a casing provided with a hole in one end, a registering mechanism in the casing, means for locking the registering mechanism including an oscillating lever, a slidable sleeve having a cam on its end adapted to enter said hole, a rod on which said sleeve is splined, a spring for normally projecting the sleeve into the hole, and a tooth on the sleeve adapted to engage the said lever whereby the same may be rocked when the sleeve is turned and lock or unlock the registering mechanism.

13. A meter for registering the operation of a related machine having a projecting lock adapted to enter a corresponding hole in the meter casing when the meter is positioned on the machine; said meter casing having a hole or recess adapted to receive the lock on the machine when the meter is placed in position thereon, a registering mechanism in the casing, a sleeve in the meter having a cam on its end adapted to enter said hole, a rotatable rod in the meter engaging said sleeve and having a key on its end in the sleeve adapted to engage and operate the lock when the latter is entered into said hole, and a lever and connections for locking and unlocking the registering mechanism; said lever being oscillated by turning the sleeve.

14. In a meter for the purpose specified, a casing having a hole in one end, a sleeve adapted to enter and close the hole, a rod rotatably mounted in the casing and having a slidable connection with the sleeve, a spring for normally projecting the sleeve into the hole, a registering mechanism in the casing, means for locking the registering mechanism and devices operable by said sleeve to engage and disengage the locking mechanism, substantially as described.

15. In a meter, a casing having a hole in one end, a sleeve adapted to enter and close the hole, a spindle rotatably mounted in the casing and having a splined connection with the sleeve, a spring for normally projecting the sleeve into the hole, a registering mechanism in the casing, and a lever for locking the registering mechanism, said sleeve having a tooth adapted to engage and operate the lever when the sleeve is turned.

16. In a machine of the character specified, having a removable meter, and a meter pin adapted to enter the meter; a bolt adapted in one position to lock out the meter pin; a second bolt adapted in one position to lock the meter in the machine; and means whereby when the meter is locked in position in the machine the meter pin is free to enter the meter, and when the meter pin is locked out of the meter the meter can be removed.

17. In a machine of the character specified, having a removable meter and a meter pin adapted to enter the meter; a rotatable member in the meter operable when the meter is in position in the machine; a bolt operable by said member adapted in one position to lock out the meter pin; a second bolt adapted in one position to lock the meter in the machine; and operable connections between the said bolts whereby when the meter is locked in position in the machine the meter pin is free to enter the meter; and when the meter pin is locked out of the meter the meter can be removed.

18. In a machine of the character specified having a removable meter, and a meter pin adapted to enter the meter when the meter is in position in the machine; a gear for operating the register in the meter when the meter is in the machine; a pawl adapted to engage the gear when the meter is removed from the machine; a bolt adapted in one position to lock out the meter pin; and devices whereby the said pawl is caused to release the gear when the bolt releases the meter pin and is permitted to engage the gear when the bolt locks out the meter pin.

19. In a machine of the character specified having a removable meter, and a meter pin adapted to enter the meter when the meter is in position in the machine; a gear for operating the register in the meter when the meter is in the machine; a pawl adapted to engage the gear when the meter is removed from the machine; a rotatable member in the meter operable when the meter is in position in the machine; a bolt operable by said member adapted in one position to lock out the meter pin; and devices whereby the said pawl is caused to release the gear when the bolt releases the meter pin and is permitted to engage the gear when the bolt locks out the meter pin.

20. In a machine of the character specified having a removable meter, and a meter pin adapted to enter the meter when the meter is in position in the machine; a gear for operating the register in the meter when the meter is in the machine; a pawl adapted to engage the gear when the meter is removed from the machine; a bolt adapted in one position to lock out the meter pin; a second bolt adapted in one position to lock the meter in the machine; means whereby when the meter is locked in position in the machine the meter pin is free to enter the meter, and when the meter pin is locked out of the meter the meter can be removed; and devices whereby the said pawl is caused to release the gear when the meter pin bolt releases the meter pin, and permitted to engage the gear when the meter pin bolt locks out the meter pin.

21. In a machine of the character specified having a removable meter, and a meter pin adapted to enter the meter when the meter is in position in the machine; a gear for operating the register in the meter when the meter is in the machine; a pawl adapted to engage the gear when the meter is removed from the machine; a rotatable member in the meter operable when the meter is in position in the machine; a bolt operated by said member adapted in one position to lock out the meter pin; a second bolt adapted in one position to lock the meter in the machine; operable connections between the said bolts whereby when the meter is locked in position in the machine the meter pin is free to enter the meter and when the meter pin is locked out of the meter the meter can be removed; and devices whereby the said pawl is caused to release the gear when the meter pin bolt releases the meter pin, and permitted to engage the gear when the meter pin bolt locks out the meter pin.

In testimony that I claim the foregoing as my own, I affix my signature.

ARTHUR H. PITNEY.